United States Patent
Kosover et al.

(10) Patent No.: US 7,601,255 B2
(45) Date of Patent: Oct. 13, 2009

(54) PROCESS FOR REMOVAL OF RESIDUAL CATALYST COMPONENTS

(75) Inventors: Vilan Kosover, Cheshire, CT (US); Jesus R. Fabian, New Fairfield, CT (US); Daniel C. Knowles, Southbury, CT (US); Mitchel Cohn, West Haven, CT (US)

(73) Assignee: Chemtura Corporation, Middlebury, CT (US)

( * ) Notice: Subject to any disclaimer, the term of this patent is extended or adjusted under 35 U.S.C. 154(b) by 508 days.

(21) Appl. No.: 11/516,452

(22) Filed: Sep. 6, 2006

(65) Prior Publication Data

US 2008/0053873 A1    Mar. 6, 2008

(51) Int. Cl.
*C10G 17/00*    (2006.01)

(52) U.S. Cl. .............. 208/262.1; 585/525; 585/531; 585/532; 585/860; 528/503; 524/437; 524/445

(58) Field of Classification Search ............ 208/262.1; 524/437, 445; 528/503; 585/525, 531, 532, 585/860
See application file for complete search history.

(56) References Cited

U.S. PATENT DOCUMENTS

| | | | |
|---|---|---|---|
| 3,164,578 A | 1/1965 | Baker et al. | |
| 3,271,380 A | 9/1966 | Dietz | |
| 4,122,126 A | 10/1978 | Taniyasu et al. | |
| 4,136,128 A * | 1/1979 | Haag et al. ............ 585/467 |
| 4,547,620 A | 10/1985 | Miyata et al. | |
| 4,701,489 A | 10/1987 | Hughes et al. | |
| 4,822,945 A | 4/1989 | Bronstert et al. | |
| 4,967,032 A | 10/1990 | Ho et al. | |
| 5,105,038 A | 4/1992 | Chen et al. | |
| 5,196,630 A * | 3/1993 | Agrawal et al. ............ 585/860 |
| 5,220,100 A | 6/1993 | Massie et al. | |
| 5,315,053 A | 5/1994 | Beach et al. | |
| 6,548,724 B2 | 4/2003 | Bagheri et al. | |
| 6,706,828 B2 | 3/2004 | DiMaio et al. | |
| 6,713,582 B2 | 3/2004 | DiMaio et al. | |
| 2005/0101761 A1 | 5/2005 | Lambert et al. | |

FOREIGN PATENT DOCUMENTS

| | | |
|---|---|---|
| EP | 1 514 879 | 3/2005 |
| JP | 55-009653 | 1/1980 |
| JP | 59-071310 | 4/1984 |
| JP | 62-054712 | 3/1987 |
| JP | 62-054713 | 3/1987 |
| WO | WO 02/14384 | 2/2002 |
| WO | WO 03/020856 | 3/2003 |
| WO | WO 2008/010862 A1 | 1/2008 |

* cited by examiner

*Primary Examiner*—Glenn Caldarola
*Assistant Examiner*—Prem C. Singh
(74) *Attorney, Agent, or Firm*—Jaimes Sher

(57) ABSTRACT

A process for reducing the level of residual catalyst comprising one or more alkylhalide, alkoxyhalide, metal halide, metal oxyhalide, alkyl metal, alkoxy metal, boron compound and coordinated metal compound wherein the metal is a Group III, Group IV, Group V, Group VI and/or Group VIII metal, from a crude organic product (e.g., polyolefins, alkylated aromatic compounds, alkylated amines, etc.) comprising the residual catalyst is provided, the process comprising contacting the crude organic product with a solid adsorbent in an adsorbent system.

24 Claims, No Drawings

PROCESS FOR REMOVAL OF RESIDUAL CATALYST COMPONENTS

BACKGROUND OF THE INVENTION

1. Technical Field

The present invention generally relates to a process for substantially removing residual catalyst components from crude organic products, e.g., crude polyalphaolefin polymerization products.

2. Description of the Related Art

Generally, in organic synthesis, catalysts are very often soluble in the resulting crude organic product and cannot be removed by simple filtration. For example, following the polymerization of an alphaolefin, the polyalphaolefin (PAO) polymerization product will contain dissolved catalyst, which needs to be removed prior to the step of hydrogenation. Accordingly, in finishing PAO, considerable amounts of money are spent on hydrogenation catalyst and hydrogen usage. Much of this cost is a direct result of the high residual polymerization catalyst levels remaining in the unfinished product, since the residual metal and halogen from the polymerization catalyst render higher hydrogenation catalyst loadings necessary during hydrogenation of the crude PAO product due to the hydrogenation catalyst being poisoned by the halogen.

The insufficient removal of catalysts, e.g., olefin polymerization catalysts, and, in particular, their metallic and halogen components, from a liquid organic product such as liquid olefin polymer also results in other undesirable problems. For example, the presence of catalyst residues may cause discoloration of the resulting polymerization products, the generation of hydrogen halide gas owing to the thermal degradation of the catalyst, the degradation or decomposition of the organic compounds owing to structural change during subsequent distillation, the poisoning by halogen contaminants of hydrogenation catalysts during subsequent polymer treatment, the formation of aluminum hydroxide slimes which are difficult to handle and the like.

Efforts have been made to remove olefin polymerization catalysts from the liquid olefin polymer. For example, U.S. Pat. No. 4,028,485 discloses a process for removing hydrogenation catalyst residue from solutions of hydrogenated olefins or olefinic polymers containing them comprising treating such solutions with a non-aqueous acid followed by neutralization with an anhydrous base and filtration. U.S. Pat. No. 4,122,126 discloses a method for removing an aluminum halide or its complex catalyst from a polymerization product comprising the steps of adding to the polymerization product an aprotic polar solvent in an amount of 1 through 6 mol per one mol of the aluminum halide in the catalyst present in the product and sufficiently mixing them at a temperature of 70° C. through 150° C., and then filtering the mixture at a temperature of 70° C. through 150° C. The addition of the aprotic polar solvent facilitates the separation of the catalyst from the polymerization product.

U.S. Pat. No. 4,476,297 discloses that the content of titanium and light metal halides and aluminum compounds in polyolefins emanating from the catalyst system can be considerably reduced by treatment with a higher, preferably branched, aliphatic monocarboxylic acid having 6 to 10 carbon atoms.

U.S. Pat. No. 4,642,408 discloses the removal of nickel, aluminum and chlorine derivatives, which remain dissolved in olefin oligomers after oligomerization in the presence of a catalyst containing such derivatives by treatment with oxygen or a gas containing oxygen, anhydrous ammonia, and a solution of an alkali metal hydroxide.

U.S. Pat. No. 4,701,489 discloses that the catalyst residues present in an on-purpose produced amorphous polyalphaolefin are deactivated by contacting the molten polymer with sufficient water to provide at least a 3:1 water/Al mole ratio and then the polymer is stabilized with a hindered phenolic antioxidant.

U.S. Patent Application Publication No. 2005/0101761 discloses a method for reducing levels of residual halogen and Group IIIb metals in a crude poly(alpha-olefin) polymerized in the presence of a catalyst comprising the halogen and Group IIIb metals, wherein the method comprises: (a) washing the crude poly(alpha-olefin) with water; (b) separating the aqueous and organic phases; (c) adding an adsorbent selected from the group consisting of magnesium silicates, calcium silicates, aluminum silicates, aluminum oxides, and clays to the organic phase to form a slurry; (d) heating the slurry under reduced pressure at a temperature of at least about 180° C. for at least about thirty minutes; and then (e) separating the adsorbent from the slurry. However, this water washing method is overly complicated, employs additional steps, e.g., decantation, filtration and drying, and produces a large amount of aqueous waste. It is also difficult to run on a continuous basis.

Additionally, in the production of styrene (also known as phenylethylene or vinylbenzene), ethylbenzene (EB) is formed by first alkylating benzene, by transalkylating polyethylbenzenes (PEBs), or by both in the presence of an alkylating catalyst, e.g., aluminum chloride, and then the EB is dehydrogenated to produce styrene. Styrene is an important monomer used in the manufacture of, e.g., plastics. As with the olefin polymerization catalysts discussed above, the insufficient removal of alkylating catalysts and, in particular, their halogen components, from the liquid ethylbenzene results in additional steps that require water which is problematic.

It would be desirable to provide an improved process for removing the catalyst residues from reaction products such as an olefin polymerization product or an alkylation reaction product, as fully as possible prior to subsequent treatment and/or use of such products.

SUMMARY OF THE INVENTION

In accordance with an embodiment of the present invention, a process for reducing the level of residual catalyst comprising one or more alkylhalide, alkoxyhalide, metal halide, metal oxyhalide, alkyl metal, alkoxy metal, boron compound and coordinated metal compound wherein the metal is a Group III, Group IV, Group V, Group VI and/or Group VIII metal, from a crude organic product comprising the residual catalyst is provided, the process comprising contacting the crude organic product with a solid adsorbent in an adsorbent system.

The process of the present invention is advantageously shorter by avoiding the use of a water washing step, decantation step and a drying step, can be run continuously and produces only solid waste which is relatively non-hazardous.

DETAILED DESCRIPTION OF THE PREFERRED EMBODIMENTS

The present invention is directed to a process for reducing the level of residual catalyst comprising one or more alkylhalide, alkoxyhalide, metal halide, metal oxyhalide, alkyl metal, alkoxy metal, boron compound and coordinated metal compound wherein the metal is a Group III, Group IV, Group V, Group VI and/or Group VIII metal, from a crude organic product, i.e., an organic product produced from an organic synthesis employing the catalyst such as, for example, a polyalphaolefin polymerization product, alkylated aromatic compound, alkylated amine, etc. Generally, in one embodiment, the crude organic product can be a polyalphaolefin polymerization product obtained by polymerizing or copolymerizing under suitable polymerization reaction conditions at least one alpha olefin in the presence of an olefin polymerization catalyst comprising an alkylhalide, alkoxyhalide, metal halide, metal oxyhalide, alkyl metal, alkoxy metal, boron compound and coordinated metal compounds used alone or in any combination wherein the metal is from Group III, Group IV, Group V, Group VI and/or Group VIII.

As used herein, the term alpha olefin shall be understood to mean a linear or branched monoolefin in which the double bond thereof is at the alpha position of the carbon chain of the monoolefin. The alpha olefins suitable for use in the preparation of the polyalphaolefin polymerization products described herein can contain from 2 to about 20 carbon atoms. Examples of such alpha olefins include, but are not limited to, ethylene, propylene, 2-methylpropene, 1-butene, 3-methyl-1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene and the like and vinyl aromatic monomers such as styrene, α-methyl styrene and the like and mixtures thereof. An alpha olefin used in the manufacture of the polyalphaolefin polymerization products of the inventive process can contain substantially one type, i.e., number of carbon atoms per molecule, of alpha olefin or it can be a mixture of two or more types of alpha olefins.

Suitable olefin polymerization catalysts and co catalysts containing at least one alkylhalide, alkoxyhalide, metal halide, metal oxyhalide, alkyl metal, alkoxy metal, boron compound and coordinated metal compound used alone or in any combination where the metal is from Group III, Group IV, Group V, Group VI and/or Group VIII, for use in preparing the polyalphaolefin polymerization products are well known in the art. Representative examples of such catalysts include, but are not limited to, Friedel-Crafts type acid catalysts, for example, metal halides such as aluminum halides, boron halides, titanium oxyhalides, vanadium oxyhalides and the like, e.g., $AlCl_3$, $AlBr_3$, $AlF_3$, $BF_3$, $BCl_3$, $BBr_3$, $TiCl_4$ and the like, alkyl aluminum halides, e.g., those having the general formulae $R_2AlCl$ and $RAlCl_2$, where R is hydrogen or an alkyl group having from 1 to about 10 carbon atoms, and the alkyl aluminums, e.g., those having the general formula $R_3Al$, where R is either hydrogen or an alkyl group having from 1 to about 10 carbon atoms, alkyl halides of the formula RX, wherein R is an alkyl group generally having from 4 to about 100 or more carbon atoms, but, more typically, from about 10 to about 40 carbon atoms, e.g., an organic chloride such as alkyl chloride. Also, the catalyst can include, either alone or in combination with a Friedel-Crafts catalyst, an ionic liquid, for example, those compounds having a general formula $Q^+A^-$, where $Q^+$ is a quaternary ammonium, quaternary phosphonium, or quaternary sulfonium, and $A^-$ is negatively charged ion such as $Cl^-$, $Br^-$, $OCl_4^-$, $NO_3^-$, $BF_4^-$, $BCl_4^-$, $Pf_6^-$, $SbF_6^-$, $AlCl_4^-$, $ArF_6^-$, $TaF_6^-$, $CuCl_2^-$, $FeCl_3^-$, $SO_3CF_7^-$, and the like.

Another suitable olefin polymerization catalyst for use herein includes a supported or unsupported metallocene catalyst. The terms "metallocene" and "metallocene procatalyst" as used herein shall be understood to refer to compounds possessing a transition metal M of the Group IV, V or V metals, at least one non-cyclopentadienyl-derived ligand X and zero or one heteroatom-containing ligand Y, the ligand being coordinated to M and corresponding in number to the valence thereof. Such compounds, cocatalysts useful for their activation to provide a metallocene catalyst that may be employed for the polymerization of olefins to provide a polyolefin homopolymer and copolymer and/or polymerization processes employing one or more of the metallocene catalysts are described in, among others, U.S. Pat. Nos. 4,752,597; 4,892,851; 4,931,417; 4,931,517; 4,933,403; 5,001,205; 5,017,714; 5,026,798; 5,034,549; 5,036,034; 5,055,438; 5,064,802; 5,086,134; 5,087,677; 5,126,301; 5,126,303; 5,132,262; 5,132,380; 5,132,381; 5,145,819; 5,153,157; 5,155,080; 5,225,501; 5,227,478; 5,241,025; 5,243,002; 5,278,119; 5,278,265; 5,281,679; 5,296,434; 5,304,614; 5,308,817; 5,324,800; 5,328,969; 5,329,031; 5,330,948; 5,331,057; 5,349,032; 5,372,980; 5,374,753; 5,385,877; 5,391,629; 5,391,789; 5,399,636; 5,401,817; 5,406,013; 5,416,177; 5,416,178; 5,416,228; 5,427,991; 5,439,994; 5,441,920; 5,442,020; 5,449,651; 5,453,410; 5,455,365; 5,455,366; 5,459,117; 5,466,649; 5,470,811; 5,470,927; 5,477,895; 5,491,205; and, 5,491,207, the contents of which are incorporated by reference herein.

The metallocene catalyst composition for use herein is formed by activating a metallocene procatalyst with a suitable cocatalyst or activator. The metallocene procatalyst is preferably one or a mixture of metallocene compounds of the following general formulae I or II:

$(Cp^1R^1{}_m)R^3(Cp^2R^2{}_p)MX_q$        (I)

$(Cp^1R^1{}_m)(Cp^2R^2{}_p)MX_q$        (II)

wherein $Cp^1$ of ligand $(Cp^1R^1{}_m)$ and $Cp^2$ of ligand $(Cp^2R^2{}_p)$ are the same or different and are cyclopentadienyl containing rings, $R^1$ and $R^2$ are the same or different and are hydrogen or a hydrocarbyl, halocarbyl, heterocarbyl, hydrocarbyl-substituted organometalloid or halocarbyl-substituted organometalloid group containing up to about 20 carbon atoms, m is 0 to 5, p is 0 to 5 and two $R^1$ and/or $R^2$ substituents on adjacent carbon atoms of the cyclopentadienyl ring associated therewith can be joined together to form a ring fused to the cyclopentadienyl ring, the fused ring containing from 4 to about 20 carbon atoms, $R^3$ can be a bridging group bridging $Cp^1$ and $Cp^2$, M is a metal from group IV, V or VI of the Periodic Table, for example, titanium, zirconium, hafnium, vanadium, niobium, tantalum, chromium, molybdenum or tungsten, and preferably zirconium, hafnium or titanium, each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, and q is equal to the valence of M minus 2. Examples of bridging group $R^3$ can be a bridging group possessing a structure of the following formulae

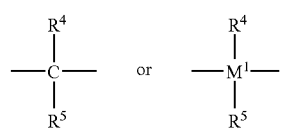

wherein $R^4$ and $R^5$ each, independently, is, or contains, a hydrocarbyl or cyclohydrocarbyl group containing up to about 20 carbon atoms, and from 0 to 3 heteroatoms such as oxygen, sulfur, tertiary nitrogen, boron or phosphorus, and $M^1$ is, for example, silicon or germanium.

Examples of bridged metallocenes of formula I for use in the process of this invention include, but are not limited to, dimethylsilyl(2-methylindenyl)(2-methylindenyl) zirconium dichloride, diphenylmethylene(cyclopentadienyl)(fluorenyl) zirconium dichloride, diphenylmethylene(indenyl)(fluorenyl)zirconium dichloride, diphenylmethylene(cyclopentadienyl)(4,5,6,7-tetrahydro-indenyl)zirconium dichloride, diphenylmethylene(cyclopentadienyl)(2-methylindenyl) zirconium dichloride, diphenylmethylene(2,4-dimethylcyclopentadienyl)(3',5'-dimethylcyclopentadienyl)zirconium dichloride, diphenylmethylene(2-methyl-4-tert-butylcyclopentadienyl) (3'-tert-butyl-5'-methylcyclopentadienyl)zirconium dichloride, dixylylmethylene(2,3,5-trimethylcyclopentadienyl) (2',4',5'-trimethylcyclopentadienyl)zirconium dichloride, dixylylmethylene(2,4-dimethylcyclopentadienyl)(3',5'-dimethylcyclopentadienyl)zirconium dichloride, dixylylmethylene(2-methyl-4-tert-butylcyclopentadienyl) (3'-tert-butyl-5-methylcyclopentadienyl)zirconium dichloride, dixylylmethylene(cyclopentadienyl)(fluorenyl)zirconium dichloride, di-o-tolylmethylene(cyclopentadienyl)(3,4-dimethyl-cyclopentadienyl)zirconium dichloride, di-o-tolylmethylene(cyclopentadienyl)(3,4-dimethyl-cyclopentadienyl)zirconium dichloride, di-o-tolylmethylene(cyclopentadienyl)(3,4-dimethylcyclopentadienyl) zirconium dichloride, di-o-tolylmethylene(cyclopentadienyl)(indenyl)zirconium dichloride, dibenzylmethylene(cyclopentadienyl)(tetramethylcyclopentadienyl)zirconium dichloride, dibenzylmethylene(cyclopentadienyl)(indenyl)zirconium dichloride, dibenzylmethylene(cyclopentadienyl)(fluorenyl)zirconium dichloride, dicyclohexylmethylene(cyclopentadienyl)(indenyl)zirconium dichloride, dicyclohexyl(cyclopentadienyl)(fluorenyl) zirconium dichloride, dicyclohexylmethylene(2-methylcyclopentadienyl)(fluorenyl)zirconium dichloride, diphenylsilyl(2,4-dimethylcyclopentadienyl)(3',5'-dimethylcyclopentadienyl)zirconium dichloride, diphenylsilyl(2,4-dimethylcyclopentadienyl)(3',5'-dimethyl-cyclopentadienyl) zirconium dichloride, diphenylsilyl(2,3,5-trimethylcyclopentadienyl)(2,4,5-trimethylcyclopentadienyl)zirconium dichloride, tetraphenyldisilyl(cyclopentadienyl)(indenyl)zirconium dichloride, tetraphenyldisilyl(3-methylcyclopentadienyl)(indenyl)zirconium dichloride, tetraphenyldisilyl(cyclopentadienyl)(fluorenyl)zirconium dichloride, di-o-tolylsilyl(cyclopentadienyl)(trimethylcyclopentadienyl)zirconium dichloride, di-o-tolylsilyl(cyclopentadienyl)(tetramethylcyclopentadienyl)zirconium dichloride, di-o-tolylsilyl(cyclopentadienyl)(3,4-diethylcyclopentadienyl)zirconium dichloride, di-o-tolylsilyl(cyclopentadienyl)(triethylcyclopentadienyl)zirconium dichloride, dibenzylsilyl(cyclopentadienyl)(fluorenyl)zirconium dichloride, dibenzylsilyl(cyclopentadienyl)(2,7-di-t-butyl-fluorenyl)zirconium dichloride, dicyclohexylsilyl(cyclopentadienyl)(fluorenyl)zirconium dichloride the analogous titanium compounds and the like and combinations thereof.

Examples of unbridged metallocenes of formula II for use in the process of this invention include, but are not limited to, (2-methylindenyl)(2-methylindenyl) zirconium dichloride, (cyclopentadienyl)(fluorenyl)zirconium dichloride, (indenyl)(fluorenyl)zirconium dichloride, (cyclopentadienyl)(4,5,6,7-tetrahydro-indenyl) zirconium dichloride, (cyclopentadienyl)(2-methylindenyl)zirconium dichloride, (2,4-dimethylcyclo-pentadienyl)(3',5'-dimethylcyclopentadienyl) zirconium dichloride, (2-methyl-4-tert-butylcyclopentadienyl) (3'-tert-butyl-5'-methylcyclopentadienyl) zirconium dichloride, (2,3,5-trimethylcyclopentadienyl) (2',4',5'-trimethylcyclopentadienyl)zirconium dichloride, (cyclopentadienyl)(3,4-dimethyl-cyclopentadienyl)zirconium dichloride, (cyclopentadienyl)(indenyl)zirconium dichloride, (cyclopentadienyl)(tetramethylcyclopentadienyl) zirconium dichloride, (cyclopentadienyl)(fluorenyl)zirconium dichloride, (cyclopentadienyl)(trimethylcyclopentadienyl)zirconium dichloride, (cyclopentadienyl)(triethylcyclopentadienyl)zirconium dichloride, (cyclopentadienyl)(2,7-di-t-butyl-fluorenyl)zirconium dichloride, (2-methylcyclopentadienyl)(fluorenyl) zirconium dichloride, (3-methylcyclopentadienyl)(indenyl)zirconium dichloride, the analogous titanium compounds and the like and combinations thereof.

The cocatalyst, or activator, employed with the bridged or unbridged metallocene procatalysts to form a metallocene catalyst composition can be any of the aluminoxanes known to activate metallocene procatalysts. For further details of the aluminoxane cocatalysts including such alkylaluminoxanes as MAO see, e.g., U.S. Pat. No. 5,229,478. If desired, the metallocene catalyst can be supported on any known support.

When employing an aluminoxane cocatalyst, it can be advantageous to include a trialkylaluminum such as trimethylaluminum, triethylaluminum, tri(n-propyl)aluminum, triisopropylaluminum, tri(n-butyl)aluminum, triisobutyl-aluminum, and the like, to reduce the amount of aluminoxane required for suitable activation of the metallocene procatalyst.

Methods for preparing metallocene procatalysts and the unsupported and supported metallocene catalyst compositions are known in the art and do not constitute a part of the present invention.

In another embodiment of the present invention, the crude reaction product is an alkylation and/or transalkylation reaction product. Generally, an alkylation and/or transalkylation reaction product is obtained by alkylating and/or transalkylating an organic molecule in the presence of an alkylating catalyst. Examples of suitable organic molecules which may be alkylated or transalkylated include aromatic compounds such as benzene, toluene, xylene, naphthalene, anthracene, naphthacene, perylene, coronene, phenanthrene and the like and mixtures thereof. The preferred aromatic hydrocarbon is benzene. Mixtures of aromatic hydrocarbons may also be employed.

Suitable alkylating agents for the alkylation of the aromatic hydrocarbon include any aliphatic or aromatic organic compound having one or more available alkylating aliphatic groups capable of reaction with the alkylatable aromatic compound. Preferably, the alkylating agent employed herein has at least one alkylating aliphatic group possessing from 1 to about 10 carbon atoms.

Another example of an alkylating agent include olefins such as those containing 2 to 5 carbon atoms, e.g., ethylene, propylene, butene-1, trans-butene-2 and cis-butene-2, or mixtures thereof. Preferred olefins are ethylene and propylene.

When transalkylation is desired, the transalkylating reaction product can be a polyalkyl aromatic hydrocarbon containing two or more alkyl groups that each may have from 2 to about 4 carbon atoms. For example, suitable polyalkyl aromatic hydrocarbons include the di-, tri- and tetra-alkyl aromatic hydrocarbons, such as diethylbenzene, triethylbenzene, diethylmethylbenzene(diethyltoluene), diisopropylbenzene, triisopropylbenzene, diisopropyltoluene, dibutylbenzene, and the like. Preferred polyalkyl aromatic hydrocarbons are the dialkyl benzenes. A particularly preferred polyalkyl aromatic hydrocarbon is diisopropylbenzene.

Suitable alkylating catalysts for use in the alkylation process include those containing at least one halogen, Group III, Group IV, Group V and/or Group VI metals. Examples of such catalysts are described above and can be used in this embodiment. A preferred alkylation catalyst is aluminum chloride.

Preferred organic reaction products which may be used in the process of the present invention include ethylbenzene from the reaction of benzene with either ethylene or polyethylbenzenes, cumene from the reaction of benzene with propylene or polyisopropylbenzenes, ethyltoluene from the reaction of toluene with ethylene or polyethyltoluenes, cymenes from the reaction of toluene with propylene or polyisopropyltoluenes, and sec-butylbenzene from the reaction of benzene and n-butenes or polybutylbenzenes.

As an example of alkylation of amines is the production of nonylated diphenylamine.

Methods for preparing the alkylation and/or transalkylation reaction products for use in the process in the present invention are known in the art and do not constitute a part of the present invention.

In the process of the present invention, the crude organic product, e.g., crude PAO polymerization product or crude alkylation and/or transalkylation reaction product containing residual catalyst comprising an alkylhalide, alkoxyhalide, metal halide, metal oxyhalide, alkyl metal, alkoxy metal, boron compound and coordinated metal compound used alone or in any combination wherein the metal is from Group III, Group IV, Group V, Group VI and/or Group VIII is contacted with a solid adsorbent in an adsorbent system to reduce the level of the residual catalyst. Suitable adsorbents include, but are not limited to, basic materials, e.g., a basic compound of an alkaline earth metal, acidic materials, e.g., silica gel, and the like and mixtures thereof. Useful basic compounds of alkaline earth metal include oxides, hydroxides, carbonates, bicarbonates or a mixture thereof of magnesium, calcium, strontium or barium and most preferably calcium. Preferred basic compounds are calcium oxide or calcium hydroxide (e.g., quick lime or slaked lime).

The adsorption may be achieved by mixing the liquid crude organic product with an absorbent in certain proportions and subsequently removing the adsorbent by separation (e.g. filtration, centrifugation, settling) or by passing the liquid crude organic product through a fixed bed, e.g., a packed column, containing the adsorbent. A suitable filter can be any pressure filter or vacuum filter, of suitable porosity to separate the adsorbent. A suitable column can be a column sized to give adequate residence time and velocity for the adsorption to take place packed with adsorbent. If desired, when using a filter, a filter aid may be employed to expedite the filtering of the crude reaction product, e.g., diatomaceous earth. Generally, the amount of adsorbent used in the adsorbent system can vary widely depending on the amount of liquid crude organic product used in the process and can readily be determined by one skilled in the art. The temperature of adsorption should be from room temperature to about 150° C., and preferably about 40° C. to about 60° C.; the residence time from about 1 minute to about 60 minutes, and preferably from about 15 minutes to about 30 minutes. The amount of adsorbent can be at least about 1.1 mole on about 1 mole of catalyst.

For elimination of $AlCl_3$, and other metal halides and oxyhalides, the crude product can be first treated with a small amount of water to form basic salts such as $Al_2(OH)_{(5-x)}Cl_x$ (where x is 1-4) and HCl and then treated with lime to substantially eliminate HCl. No separate water phase is formed by this addition. The amount of water can range from about 0.001% to about 10 weight %, based on the weight of the crude product.

The following non-limiting examples are illustrative of the present invention.

EXAMPLE 1

100 g of crude polydecene material, produced with a metallocene catalyst and methylalumoxane (MAO) co catalyst, containing 348 ppm aluminum was treated with 2 g solid CaO (-20 mesh) in a beaker with a magnetic stirrer at 50° C. for 10 minutes. The crude material was then filtered through a 10 micron asbestos pressure filter using 20 to 80 psi nitrogen pressure. The rate of filtration was 10 $L/m^2/min$. The level of aluminum in the crude polydecene material after filtration was reduced to less than 6 ppm aluminum. The filtered CaO contained 0.54% Al (5400 ppm).

COMPARATIVE EXAMPLE A 100 g of crude polydecene material, produced with a metallocene catalyst and methylalumoxane (MAO) co catalyst, containing 348 ppm aluminum was washed with 25 ml water at room temperature for 15 minutes, separated and filtered through an asbestos fine filter (1 μm). The organic phase was separated and evaporated. The final crude polydecene material contained less than 6 ppm aluminum.

EXAMPLE 2

200 g crude polydecene material containing 392 ppm aluminum was treated with 1 g silica gel by substantially the same method as in example 1 at 50° C. for 15 minutes. The level of aluminum in the crude polydecene material after filtration was reduced to less than 2 ppm aluminum and the silica gel contained 1.66% aluminum.

EXAMPLE 3

150 g crude polydecene material produced with trialkylaluminum/isobutylbromide catalyst containing 0.086% (860 ppm) aluminum and 2.24% bromine was diluted with 50 g of decene and treated with 5 g CaO by substantially the same method as in Example 1 at 50° C. for 15 minutes. The level of aluminum and bromine in the polydecene material after filtration was reduced to 5 ppm aluminum and 0.27% bromine. The filtered CaO contained 1.71% Al. The amount of aluminum and bromine removed was 99.42% and 89.3%, respectively.

EXAMPLE 4

Crude polydecene (200 g) containing 145 ppm Al was treated with MgO powder (0.65 g) at 50° C. over 30 minutes. After filtration, the polydecene product contained <0.5 ppm Al; MgO precipitate (0.84 g) contained 3.2% Al.

EXAMPLE 5

Crude nonylated diphenylamine (DPA) (100 g) containing 0.39% Al and 1.7% Cl (from $AlCl_3$ catalyst) was mixed with 10 g of CaO and 1 g water and stirred at 50° C. over 1 hour. The mixture was then filtrated. After filtration, the nonylated DPA product contained less than 15 ppm Al (<0.0015%) and 0.17% Cl. Lime precipitate analysis showed 3.3% Al and 11.1% Cl. Thus, 100% Al and 88.2% Cl have been eliminated.

EXAMPLE 6

Crude nonylated DPA (100 g) containing 0.39% Al and 1.7% Cl (from $AlCl_3$ catalyst) was mixed with 7 g of 200 mesh slaked lime ($Ca(OH)_2$) and 1 g of water and stirred at 50° C. over 1 hour. The mixture was then filtered. After filtration, nonylated DPA contained less than 15 ppm Al (<0.0015%) and less than 10 ppm Cl (<0.001%). Thus elimination of both Al and Cl was 100%.

EXAMPLE 7

100 g nonylated DPA, contained 0.38% Al and 1.7% Cl (from $AlCl_3$ catalyst) was mixed with 2 g water and stirred at 50° C. over 1 hour. A precipitate was formed and after filtration nonylated DPA was mixed with 5 g $Ca(OH)_2$ adsorbent and stirred at 50° C. for 1 hr. The final product contained less than 15 ppm both Al and Cl. The precipitate was 3.6 g and contained 11.2% Al and 39.96% Cl; the resulting calcium hydroxide adsorbent weighed 5.6 g and contained 0.18% Al and 6.02% Cl.

EXAMPLE 8

2.66 g of $FeCl_3.6H_2O$ was dissolved in 100 g ethanol. The solution was treated for 30 minutes with 3 g of CaO at 40° C. in a beaker equipped with a magnetic stirrer. A precipitate was formed and after filtration the final ethanol solution contained less than 15 ppm Fe and the precipitate contained 14.1% Fe. Accordingly, the removal of iron from the solution into the precipitate was 100%. The residue chlorine remaining in the ethanol solution was 0.09% and thus 91.2% of the chlorine was also absorbed by the precipitate.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A process for reducing, from a crude organic product, the level of a residual catalyst used to form an organic product, the process comprising
   contacting the crude organic product with a treatment consisting of a solid adsorbent,
   wherein the solid adsorbent is selected from the group consisting of an oxide or hydroxide of magnesium, calcium, strontium, barium, sodium and potassium, and
   wherein the residual catalyst is selected from the group consisting of metal halide, metal oxyhalide, alkyl metal, alkoxy metal, boron compounds and coordinated metal compounds, the metal of the residual catalyst is selected from the group consisting of Group IIIb, Group IVa, Group Va, Group VIa, and Group VIIIa metals; and
   filtering the crude organic product to remove the metal of the residual catalyst.

2. The process of claim 1, wherein the crude organic product is a polymer.

3. The process of claim 1, wherein the crude organic product is a polyolefin.

4. The process of claim 1, wherein the crude organic product is a polylalphaolefin.

5. The process of claim 1, wherein the crude organic product is polydecene.

6. The process of claim 1, wherein the crude organic product is derived from an alkylation or transalkylation reaction.

7. The process of claim 1, wherein the crude organic product is an alkylated benzene.

8. The process of claim 1, wherein the crude organic product is ethyl benzene.

9. The process of claim 1, wherein the crude organic product is an alkylated diphenylamine.

10. The process of claim 1, wherein the crude organic product is nonylated diphenylamine.

11. The process of claim 1, wherein residual catalyst is a metal halide and the halide is selected from the group consisting of chlorine, bromine and mixtures thereof.

12. The process of claim 1, wherein the halide is chlorine.

13. The process of claim 1, wherein the halide is bromine.

14. The process of claim 1, wherein the Group IIIa metal is aluminum.

15. The process of claim 1, wherein the Group VIIIb metal is iron.

16. The process of claim 1, wherein the Group IVb-VIb metal is selected from the group consisting of titanium, zirconium, hafnium, vanadium, niobium, tantalum, chromium, molybdenum, tungsten and mixtures thereof.

17. The process of claim 1, wherein the adsorbent is an oxide or hydroxide of calcium.

18. The process of claim 1, wherein the adsorbent system is a fixed or fluidized bed.

19. The process of claim 1, wherein the adsorbent system is contained in a packed column.

20. The process of claim 1, wherein the adsorbent system is mixed with the crude product and then separated.

21. The process of claim 20, wherein the adsorbent is removed by filtration.

22. The process of claim 1, wherein a diluent is added to the crude organic product.

23. The process of claim 1, wherein a solvent is added to the crude organic product.

24. The process of claim 1, wherein the crude organic product is polydecene and the process further comprises adding decene to polydecene.

* * * * *

UNITED STATES PATENT AND TRADEMARK OFFICE
CERTIFICATE OF CORRECTION

PATENT NO. : 7,601,255 B2
APPLICATION NO. : 11/516452
DATED : October 13, 2009
INVENTOR(S) : Vilan Kosover et al.

It is certified that error appears in the above-identified patent and that said Letters Patent is hereby corrected as shown below:

Column 10, lines 3 to 4, the claim phrase "Group IIIb, Group IVa, Group Va, Group VIa, and Group VIIIa metals" should read --Group IIIa, Group IVb, Group Vb, Group VIb, and Group VIIIb metals--.

Column 10, line 12, the claim term "polylalphaolefin" should read --polyalphaolefin--.

Signed and Sealed this

Twenty-ninth Day of December, 2009

David J. Kappos
*Director of the United States Patent and Trademark Office*